(12) United States Patent
Javer et al.

(10) Patent No.: US 9,743,221 B2
(45) Date of Patent: Aug. 22, 2017

(54) USER ASSOCIATION WITH PASSIVE TAGS

(71) Applicant: Honeywell International Inc., Morristown, NJ (US)

(72) Inventors: Mahdi Javer, Calgary (CA); Kirk William Johnson, Calgary (CA); Kelly Englot, Calgary (CA); Stephen Mroszczak, Calgary (CA)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/825,097

(22) Filed: Aug. 12, 2015

(65) Prior Publication Data
US 2017/0048650 A1 Feb. 16, 2017

(51) Int. Cl.
*G06K 7/10* (2006.01)
*H04W 4/00* (2009.01)
(Continued)

(52) U.S. Cl.
CPC .......... *H04W 4/008* (2013.01); *H04B 5/0031* (2013.01); *H04Q 9/00* (2013.01); *H04Q 2209/47* (2013.01); *H04Q 2209/823* (2013.01)

(58) Field of Classification Search
CPC ................. G01N 1/2273; G01N 1/26; G01N 2001/2276; H04W 4/008; H04B 5/0031
(Continued)

(56) References Cited

U.S. PATENT DOCUMENTS 4,525,266 A * 6/1985 Schmidt ............ G01N 27/4045
204/412
5,068,798 A * 11/1991 Heath ....................... G01N 1/26
250/343
(Continued)

FOREIGN PATENT DOCUMENTS

EP 2887062 A2 6/2015
GB 2345971 A * 7/2000 ......... G01N 33/0009
(Continued)

OTHER PUBLICATIONS

U.S. Appl. No. 14/825,081, Office Action, dated Jun. 7, 2016, 20 pages.
(Continued)

*Primary Examiner* — Claude J Brown
(74) *Attorney, Agent, or Firm* — Conley Rose, P.C.; Kristin Jordan Harkins

(57) ABSTRACT

Embodiments relate generally to methods and systems for user association with a gas detector using passive NFC tags. Applicants propose a gas detector with a near-field communication (NFC) reader built into the gas detector, thereby allowing the user to scan their employee identification (ID) badge or a specialized individualized NFC tag. In some embodiments, an NFC tag may be attached to an employee ID badge. The gas detector may communicate via NFC with the badge and/or tag, and may recognize the badge and/or tag as associated with a specific user. When the user starts their shift, the gas detector with an NFC reader can scan the tag and associate the user with the detector and store the (Continued)

information in a log for archival purposes. This process can be completed by the user, and does not require connecting the gas detector to a computer to provide the association.

17 Claims, 2 Drawing Sheets

(51) Int. Cl.
*H04Q 9/00* (2006.01)
*H04B 5/00* (2006.01)
(58) Field of Classification Search
USPC .............................................. 235/379, 462.44
See application file for complete search history.

(56) References Cited

U.S. PATENT DOCUMENTS

| | | | |
|---|---|---|---|
| 5,468,968 A * | 11/1995 | Bailey | G01T 7/04 250/304 |
| 6,720,866 B1 | 4/2004 | Sorrells et al. | |
| 6,809,646 B1 * | 10/2004 | Lee | G06K 19/07749 235/487 |
| 7,397,370 B2 | 7/2008 | Bratkovski | |
| 7,782,224 B2 * | 8/2010 | Marchetti | G06K 15/00 340/815.4 |
| 8,624,725 B1 | 1/2014 | MacGregor | |
| 2001/0040512 A1 | 11/2001 | Hines et al. | |
| 2005/0088299 A1 | 4/2005 | Bandy et al. | |
| 2006/0237648 A1 * | 10/2006 | Bushberg | G01T 7/00 250/336.1 |
| 2007/0013516 A1 | 1/2007 | Freitag et al. | |
| 2007/0052540 A1 | 3/2007 | Hall et al. | |
| 2007/0241261 A1 * | 10/2007 | Wendt | G01D 9/005 250/221 |
| 2008/0030324 A1 | 2/2008 | Bekritsky et al. | |
| 2008/0101400 A1 | 5/2008 | Auterinen | |
| 2008/0159547 A1 * | 7/2008 | Schuler | G01H 3/14 381/56 |
| 2008/0231836 A1 | 9/2008 | Curello et al. | |
| 2009/0058635 A1 * | 3/2009 | LaLonde | A61N 1/37282 340/539.11 |
| 2009/0058648 A1 | 3/2009 | Tuttle | |
| 2009/0091465 A1 * | 4/2009 | Buckingham | A61B 5/11 340/683 |
| 2009/0184165 A1 | 7/2009 | Bertness et al. | |
| 2009/0231099 A1 | 9/2009 | Hyde et al. | |
| 2010/0241464 A1 * | 9/2010 | Amigo | G06Q 40/08 705/4 |
| 2011/0037599 A1 * | 2/2011 | Johnson, Jr. | H04W 4/043 340/632 |
| 2011/0043373 A1 | 2/2011 | Best et al. | |
| 2012/0007736 A1 * | 1/2012 | Worthington | G08B 17/117 340/539.22 |
| 2012/0063956 A1 | 3/2012 | Truex et al. | |
| 2013/0002405 A1 | 1/2013 | Pesonen et al. | |
| 2013/0244615 A1 | 9/2013 | Miller | |
| 2014/0293306 A1 | 10/2014 | Tredoux et al. | |
| 2014/0336920 A1 | 11/2014 | Burrell et al. | |
| 2014/0349707 A1 | 11/2014 | Bang | |
| 2015/0102926 A1 * | 4/2015 | Kamalakannan | G06Q 10/0631 340/539.13 |
| 2015/0116093 A1 * | 4/2015 | Swager | G06K 19/0717 340/10.4 |
| 2015/0269818 A1 | 9/2015 | Jain et al. | |

FOREIGN PATENT DOCUMENTS

| | | |
|---|---|---|
| WO | 9207261 A1 | 4/1992 |
| WO | 2012006090 A2 | 1/2012 |
| WO | 2013185821 A1 | 12/2013 |
| WO | 2016118355 A1 | 7/2016 |

OTHER PUBLICATIONS

U.S. Appl. No. 14/825,081, Final Office Action, dated Oct. 19, 2016, 18 pages.
PCT Application No. PCT/US2016/012942, International Search Report, dated Apr. 5, 2016, 4 pages.
PCT Application No. PCT/US2016/012942, Written Opinion of the International Searching Authority, dated Apr. 5, 2016, 5 pages.
Europe Patent Application No. 16182897.5, Extended European Search Report, dated Nov. 21, 2016, 11 pages.
Whitson Gordon: "How to Automate Your Phone for Every Room in the House with NFC Tags", Lifehacker, Apr. 16, 2013, Retrieved from the Internet: http://lifehacker.com/how-to-automate-your-phone-for-every-room-in-the-house-473409962, retrieved on Jun. 23, 2015, 6 pages.
Europe Patent Application No. 16182884.3 Extended European Search Report, dated Dec. 15, 2016, 8 pages.

* cited by examiner

USER ASSOCIATION WITH PASSIVE TAGS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In hazardous work environments, user may carry gas detectors with them as they work, to allow for detection of gas exposure. The gas detector may alert the user if an exposure limits are reached while the user is wearing the gas detector. Gas detectors may comprise interfaces for communicating with the user, such as displays, lights, buzzers, and input buttons.

SUMMARY

Aspects of the disclosure may include embodiments of a method for associating a user with gas exposure data comprising placing a near-field communication (NFC) tag in proximity to a gas detector, wherein the gas detector comprises an NFC reader, and wherein the NFC tag is attached to an identification (ID) badge; receiving, by the gas detector, user information from the NFC tag; associating all further gas exposure data with the user information received from the NFC tag; and storing the gas exposure data and associated user information.

In some embodiments, the method may further comprise powering on the gas detector, and completing start up procedures, by the gas detector. In some embodiments, user specific information is stored on the NFC tag. In some embodiments, the method may further comprise setting alarm limits based on the user information received from the NFC tag. In some embodiments, the method may further comprise communicating the gas exposure data and associated user information to a central monitoring station. In some embodiments, the method may further comprise placing a second NFC tag in proximity to a gas detector, wherein the second NFC tag is attached to an ID badge; receiving, by the gas detector, second user information from the second NFC tag; updating the user information on the gas detector to the second user information; associating all further gas exposure data with the second user information; and storing the gas exposure data and associated second user information.

Additional aspects of the disclosure may include embodiments of a gas detector system comprising a user identification (ID) badge, wherein the ID badge comprises an near-field communication (NFC) tag; and user information stored on the NFC tag; and a gas detector, wherein the gas detector is operable to detect gas levels in the environment and provide alerts, alarms, and other indications to a user, and wherein the gas detector comprises an NFC reader operable to pair with the NFC tag of the ID badge; a user interface; and a processor and storage operable to receive and store gas exposure information, and associate the received gas exposure information with the paired user.

In some embodiments, the gas detector comprises a single button for input from a user to the gas detector. In some embodiments, the gas detector comprises one or more buttons for input from a user to the gas detector. In some embodiments, the ID badge is formed including the NFC tag. In some embodiments, the NFC tag is attached to an already formed ID badge. In some embodiments, user information comprises user identification, personalized gas detector settings. In some embodiments, user information comprises personalized exposure alarm limits, which are implemented by the gas detector, wherein the personalize exposure alarm limits are based on the job and work site of the user and the health and previous exposure of the user. In some embodiments, the gas detector communicates the gas exposure data and associated user information to a central monitoring station. In some embodiments, the gas detector comprises wireless communication capabilities. In some embodiments, the gas detector is operable to pair with a second ID badge comprising a second NFC tag, update the user information, and associate further gas exposure data with the new user information.

Other aspects of the disclosure may include embodiments of a method for associating a user with gas exposure data comprising placing a near-field communication (NFC) tag in proximity to a gas detector, wherein the gas detector comprises an NFC reader, and wherein the NFC tag is attached to an identification (ID) badge; receiving, by the gas detector, user information from the NFC tag, wherein the user information comprises user identification and personalized gas detector settings; altering the settings of the gas detector based on the personalized gas detector settings; associating all further gas exposure data with the user identification; and storing the gas exposure data and associated user information.

In some embodiments, the personalized gas detector settings are set based on the user's job and work area. In some embodiments, the personalized gas detector settings are set based on a user's health and previous gas exposure information. In some embodiments, the method may further comprise placing a second NFC tag in proximity to a gas detector, wherein the second NFC tag is attached to an ID badge; receiving, by the gas detector, second user information from the second NFC tag; updating the user information on the gas detector to the second user information; associating all further gas exposure data with the second user information; and storing the gas exposure data and associated second user information.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
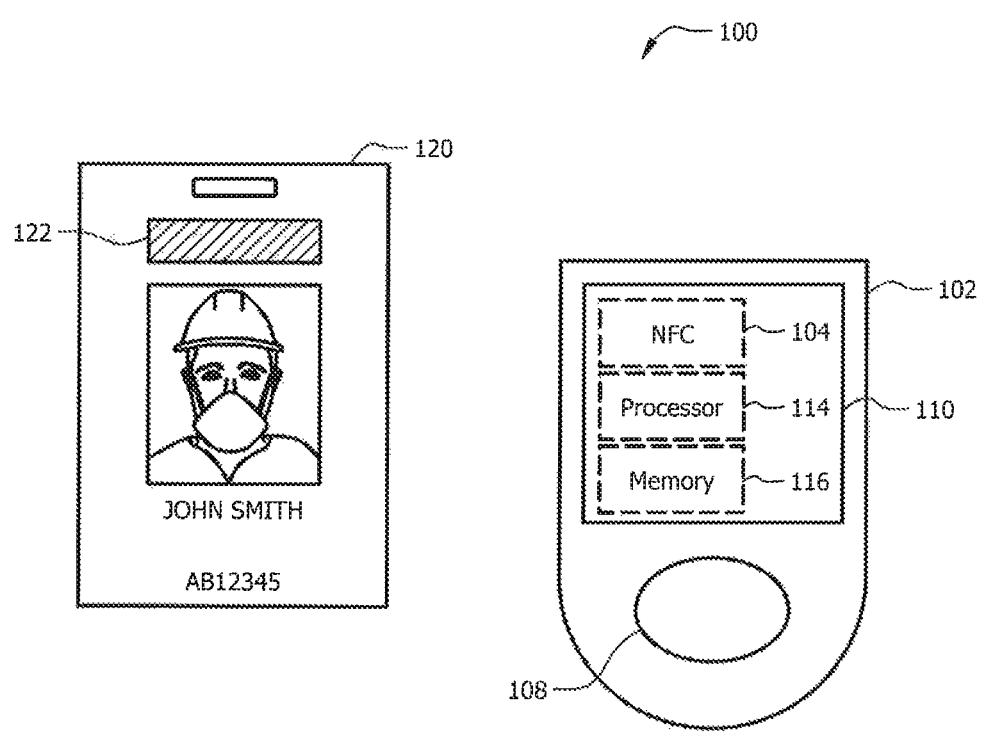
FIG. 1 illustrates a gas detector system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include methods and systems for user association with a gas detector using passive NFC tags. An NFC tag may be attached to a user ID badge, and the gas detector may have an NFC reader built into the gas detector.

Ensuring worker health and safety is an important for businesses operating in potentially hazardous environments. For companies whose employees work in environments where there is a possibility of gas exposure, monitoring each employee's exposure to gas is important to ensure their safety. An increasing number of companies recognize the benefit in tracking individual employees' long term exposure to gas. Associating a user to a specific gas detector worn by the user could provide this information at an individual level. For current systems, entry of user information to a gas detector can only be done via connection to a computer by an authorized employee, wherein the computer may send user information to the gas detector over a wired connection. When a shift change occurs, the next set of employees would need to be associated with the gas detectors which can become a long process within larger companies that have large numbers of employees.

To solve this problem, Applicants propose a gas detector with a near-field communication (NFC) reader built into the gas detector, thereby allowing the user to scan their employee identification (ID) badge or a specialized individualized NFC tag. In some embodiments, an NFC tag may be attached to an employee ID badge. The gas detector may communicate via NFC with the badge and/or tag, and may recognize the badge and/or tag as associated with a specific user. When the employee (user) starts their shift for the day, the gas detector with an NFC reader can scan the tag and associate the user with the detector and store the information in a log for archival purposes. This process can be completed by the user, and does not require connecting the gas detector to a computer to provide the association.

Gas detectors equipped with an NFC reader can perform self-assignment using an ID card with a passive NFC tag containing user information. The user can initiate the self-assignment mode and a simple tap of the ID card to the gas detector can associate the user to the gas detector and include the information in the log files. The use of a gas detector comprising an NFC reader and an NFC tag associated with a specific user would allow a user to quickly and easily perform self-assignment with the gas detector, removing the need for an external computer interface (and additional steps and time) to perform the assignment.

Once a user has assigned the device to their user identification, the data collected by the gas detector may be associated with the user ID and stored by the gas detector. This data may eventually be stored in a health and safety record that includes total exposure information, as well as gas event information, for a specific user.

Referring now to FIG. 1, an exemplary embodiment of the system 100 is described. The system may comprise a gas detector 102, wherein the gas detector 102 comprises an NFC reader 104. The gas detector 102 may comprise any type of gas detector operable to detect gas levels in the environment and provide alerts, alarms, and other indications to a user. In some embodiments, the gas detector 102 may be operable to communicate with a central monitoring station. In some embodiments, the gas detector 102 may comprise wireless communication capabilities.

The gas detector may comprise a user interface 110 operable to interact with a user, wherein the user interface may comprise a display, one or more light, and one or more buzzers, as well as other indicators. Additionally, in some embodiments, the gas detector 102 may comprise a single button 108 for input from a user to the gas detector 102. In some embodiments, the gas detector 102 may comprise multiple buttons 108 for input from a user.

The system 100 may also comprise a user ID badge 120, wherein the badge 120 comprises an NFC tag 122 attached to a portion of the badge 120. In some embodiments, the ID badge 120 may be formed including the NFC tag 122. In other embodiments, the NFC tag 122 may be attached to an already formed ID badge 120. The user info may be stored on the NFC tag of the ID badge. User information may comprise identification number, name, job, and/or work area. In some embodiments, the job and/or work area information may include specific settings for the gas detector, which may be implemented by the gas detector. In some embodiments, the user information may comprise personalized exposure alarm limits, which may be implemented by the gas detector, wherein each user may have distinct exposure limits based on the health and previous exposure of the user.

The gas detector 102 may comprise a processor 114 and storage 116 for receiving user information via NFC, implementing the user information as necessary, receiving and storing gas exposure information, and associating the received gas exposure information with the paired user. In some embodiments, the user information may comprise indicators for the type of information. For example, the data format may be "parameter=value," such as "user ID=John Smith" and "alarm settings=X," wherein the processor 114 may direct the information as indicated by the parameter indicator.

The gas exposure levels recorded by the gas detector 102 may be stored and associated with the user that has paired their ID tag with the gas detector 102. This information may be monitored to determine short-term and/or long-term exposure levels for a user. For example, a short-term exposure limit may comprise a 15 minute total exposure limit, and a long-term exposure limit may comprise an 8 hour exposure limit. In some embodiments, this information may be communicated to a central monitoring station, which may happen wirelessly and/or over a wired connection, possibly once the gas detector is place out of use at the end of a shift, for example.

The use of NFC to associate a user with a gas detector may also be useful for providing quick way to switch the user association for a gas detector, for example at a shift change. If the detector is used by another user, the new user can update the user information on the gas detector 102 by pairing their ID tag 120 with the NFC reader 104 of the gas detector 102. Then, the exposure levels detected by the gas detector 102 will be associated with the new user and stored by the gas detector 102.

Figure 2:
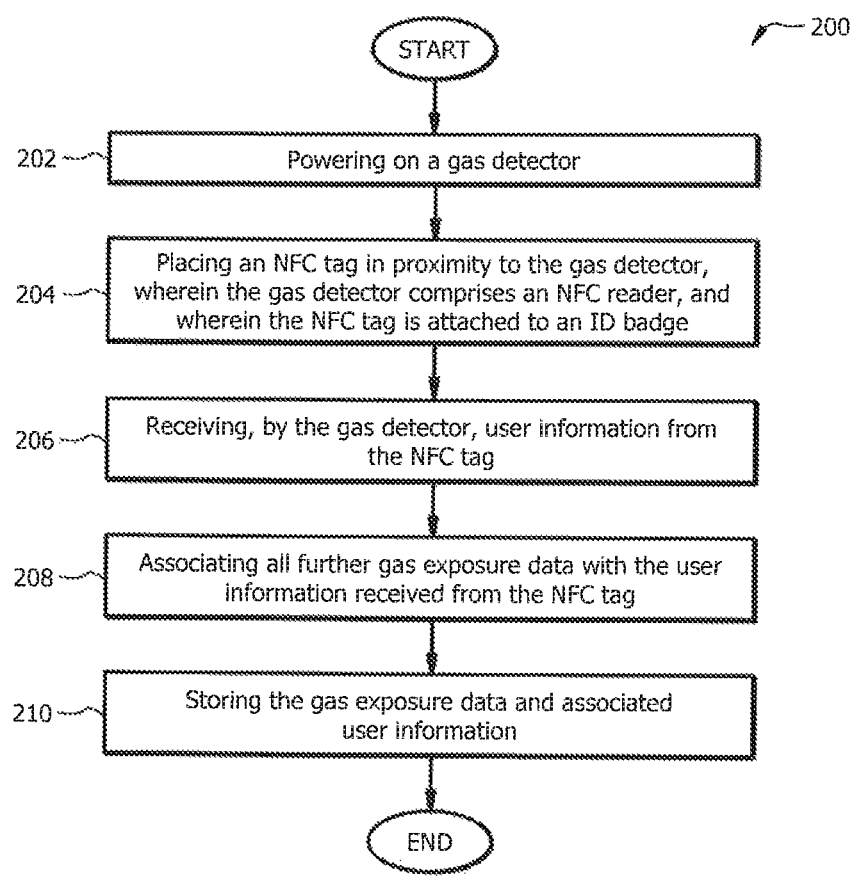
FIG. 2 illustrates a method for associating a user with a gas detector according to an embodiment of the disclosure.

FIG. 2 shows an exemplary method 200 for associating a user with gas exposure data. At step 202, the gas detector is powered on. In some embodiments, the gas detector may comprise start up procedures, such as calibration, zeroing, etc. At step, 204, an NFC tag may be placed in proximity to the gas detector, wherein the gas detector comprises an NFC reader, and wherein the NFC tag is attached to an II) badge. In some embodiments, user specific information may be stored on the NFC tag. At step 206, the gas detector may receive the user information from the NFC tag. At step 208, the gas detector may associate all further gas exposure data with the user information received from the NFC tag. In some embodiments, the gas detector may also set alarm limits based on the user information received from the NFC tag. At step 210, the gas exposure data and associated user information may be stored by the gas detector. In some embodiments, the gas exposure data and associated user information may be communicated to a central monitoring station.

In some embodiments, the method may further comprise pairing with a second ID badge comprising a second NFC tag, updating the user information, and associating all further gas exposure data with the new user information.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for associating a user with gas exposure data comprising:
   placing a near-field communication (NFC) tag in proximity to a gas detector configured to be worn by the user, wherein the gas detector comprises an NFC reader, and wherein the NFC tag is attached to an identification (ID) badge associated with the user;
   receiving, by the NFC reader of the gas detector, user information from the NFC tag to associate the gas detector with the user, wherein the user information comprises personalized gas detector settings;
   setting, by the gas detector, alarm limits based on the user information received from the NFC tag;

associating, by the gas detector without connecting to a computer that is external to the gas detector, all further gas exposure data with the user information received from the NFC tag while the gas detector is associated with the user; and storing the gas exposure data and associated user information.

2. The method of claim 1 further comprising powering on the gas detector, and completing start up procedures, by the gas detector.

3. The method of claim 1, wherein user specific information is stored on the NFC tag.

4. The method of claim 1 further comprising communicating the gas exposure data and associated user information to a central monitoring station.

5. The method of claim 1 further comprising:
placing a second NFC tag in proximity to a gas detector, wherein the second NFC tag is attached to a second ID badge;
receiving, by the gas detector, second user information from the second NFC tag;
updating the user information on the gas detector to the second user information;
associating all further gas exposure data with the second user information; and
storing the gas exposure data and associated second user information.

6. A method for associating a user with gas exposure data comprising:
placing a near-field communication (NFC) tag in proximity to a gas detector that is worn by the user, wherein the gas detector comprises an NFC reader, and wherein the NFC tag is attached to an identification (ID) badge that is associated with the user;
receiving, by the gas detector worn by the user, user information from the NFC tag, wherein the user information comprises user identification and personalized gas detector settings;
altering, by the gas detector worn, the settings of the gas detector based on the personalized gas detector settings relating to the user's health and the user's previous gas exposure information;
associating, by the gas detector without connecting to a computer that is external to the gas detector, all further gas exposure data from detected gas levels with the user identification based on the personalized gas detector settings; and
storing the gas exposure data and associated user information.

7. The method of claim 6, wherein the personalized gas detector settings are set based on the user's job and work area.

8. The method of claim 6 further comprising:
placing a second NFC tag in proximity to a gas detector, wherein the second NFC tag is attached to a second ID badge;
receiving, by the gas detector, second user information from the second NFC tag;
updating the user information on the gas detector to the second user information;
associating all further gas exposure data with the second user information; and
storing the gas exposure data and associated second user information.

9. A gas detector system comprising:
a user identification (ID) badge associated with a user, wherein the ID badge comprises:
a near-field communication (NFC) tag; and
user information stored on the NFC tag, wherein the user information comprises personalized exposure alarm limits that are based on a job and work site of the user and based on the health and previous gas exposure information of the user; and
a gas detector operable to be worn by the user, wherein the gas detector is operable to detect gas levels in the environment and provide alerts and alarms to a user, and wherein the gas detector comprises:
an NFC reader operable to wirelessly pair with the NFC tag of the ID badge;
a user interface; and
a processor and storage that configure the gas detector to:
receive the user information from the NEC tag,
in response to the received user information, alter setting for gas detection to the personalized exposure alarm limits that are based on a job and work site of the user and based on the health and previous gas exposure information of the user,
receive and store gas exposure information based on detected gas levels, and
associate the received gas exposure information with the paired user without requiring connection to a computer that is external to the gas detector.

10. The system of claim 9, wherein the gas detector comprises a single button for input from the user to the gas detector.

11. The system of claim 9, wherein the gas detector comprises one or more buttons for input from the user to the gas detector.

12. The system of claim 9, wherein the ID badge is formed including the NFC tag.

13. The system of claim 9, wherein the NFC tag is attached to an already formed ID badge.

14. The system of claim 9, wherein user information comprises user identification, personalized gas detector settings.

15. The system of claim 9, wherein the gas detector communicates the gas exposure data and associated user information to a central monitoring station.

16. The system of claim 9, wherein the gas detector comprises wireless communication capabilities.

17. The system of claim 9, wherein the gas detector is operable to pair with a second ID badge comprising a second NFC tag, update the user information, and associate further gas exposure data with the new user information.

* * * * *

UNITED STATES PATENT AND TRADEMARK OFFICE
CERTIFICATE OF CORRECTION

PATENT NO. : 9,743,221 B2  
APPLICATION NO. : 14/825097  
DATED : August 22, 2017  
INVENTOR(S) : Mahdi Javer et al.

Page 1 of 1

It is certified that error appears in the above-identified patent and that said Letters Patent is hereby corrected as shown below:

In the Claims

Column 8, Line 25 Claim 9: "NEC" should be "NFC"

Column 8, Line 27 Claim 9: "setting" should be "settings"

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*